United States Patent
Chuu et al.

(10) Patent No.: US 8,970,944 B2
(45) Date of Patent: Mar. 3, 2015

(54) ULTRABRIGHT LONG BIPHOTON GENERATION WITH NON-LINEAR OPTICAL MATERIAL

(71) Applicant: The Board of Trustees of the Leland Stanford Junior University, Palo Alto, CA (US)

(72) Inventors: Chih-Sung Chuu, Hsinchu (TW); Guang-Yu Yin, Mountain View, CA (US); Stephen E. Harris, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 130 days.

(21) Appl. No.: 13/866,616

(22) Filed: Apr. 19, 2013

(65) Prior Publication Data

US 2014/0092467 A1    Apr. 3, 2014

Related U.S. Application Data

(60) Provisional application No. 61/635,772, filed on Apr. 19, 2012.

(51) Int. Cl.
  *G02F 1/35* (2006.01)
  *G02F 1/39* (2006.01)
(52) U.S. Cl.
  CPC .......... *G02F 1/39* (2013.01); *G02F 2001/3542* (2013.01)
  USPC ............................................ 359/330; 372/21

(58) Field of Classification Search
  USPC ............................................. 359/330; 372/21
  See application file for complete search history.

(56) References Cited

U.S. PATENT DOCUMENTS

| | | | |
|---|---|---|---|
| 6,167,067 A * | 12/2000 | Meyer et al. | 372/21 |
| 6,982,822 B2 | 1/2006 | Teich et al. | |
| 7,359,514 B2 | 4/2008 | Trifonov et al. | |
| 7,373,059 B2 | 5/2008 | Spillane et al. | |
| 7,639,953 B2 | 12/2009 | Spillane et al. | |
| 7,859,744 B2 | 12/2010 | Trifonov et al. | |
| 2010/0079833 A1 | 4/2010 | Langford et al. | |
| 2010/0277712 A1* | 11/2010 | Zaugg | 356/5.01 |
| 2010/0290487 A1* | 11/2010 | Wu | 372/21 |
| 2012/0134377 A1 | 5/2012 | Shimizu et al. | |

OTHER PUBLICATIONS

Canalias et al., "Mirrorless optical parametric oscillator", 2007, pp. 459-462, Nature Photonics v1.

(Continued)

*Primary Examiner* — Hemang Sanghavi
(74) *Attorney, Agent, or Firm* — Lumen Patent Firm

(57) ABSTRACT

Improved production of entangled photon pairs (biphotons) via spontaneous parametric down conversion (SPDC) is provided. In one aspect, forward-wave SPDC is performed in a monolithic resonator (resonant for both signal and idler) having a double pass pump geometry to provide a spectrally bright source of biphotons. In another aspect, backward-wave SPDC is performed in a resonator (resonant for both signal and idler) to provide a spectrally bright source of biphotons. For either of these approaches, the biphotons can be made to have polarization entanglement by using quasi phasematching (QPM) with two QPM periods simultaneously.

21 Claims, 9 Drawing Sheets

(56) References Cited

OTHER PUBLICATIONS

Thyagarajan et al., "Generation of polarization-entangled photons using type-II doubly periodically poled lithium niobate waveguides", 2009, pp. 052321-1 to 052321-8, Physical Review A v80.

Ikegami et al., "Characteristics of a cw monolithic KTiOPO4 optical parametric oscillator", 1998, pp. 719-725, Applied Physics B v 66.

Fiorentino et al., "Generation of ultrabright tunable polarization entanglement without spatial, spectral or temporal constraints", 2004, pp. 041801-1 to 041801-4, Physical Review A v69.

Fedrizzi et al., "A wavelength-tunable fiber-coupled source of narrowband entangled photons", 2007, pp. 15377-15386, Optics Express v15n23.

Scholz et al., "Single-mode operation of a high-brightness narrow-band single-photon source", 2009, pp. 201105-1 to 201105-3, Applied Physics Letters v94.

Scholz et al., "Statistics of narrow-band single photons for quantum memories generated by ultrabright cavity-enhanced parametric down-conversion", 2009, pp. 063603-1 to 063603-4, Physical Review Letters v102.

Sangouard et al., "Quantum repeaters based on atomic ensembles and linear optics", Mar. 21, 2011, pp. 33-80, Reviews of Modern Physics, v83n1.

* cited by examiner

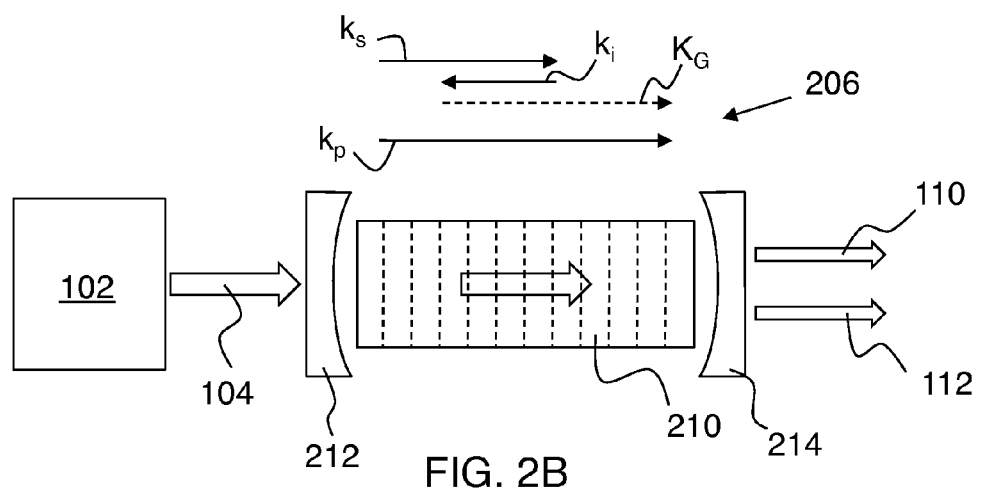
FIG. 2B
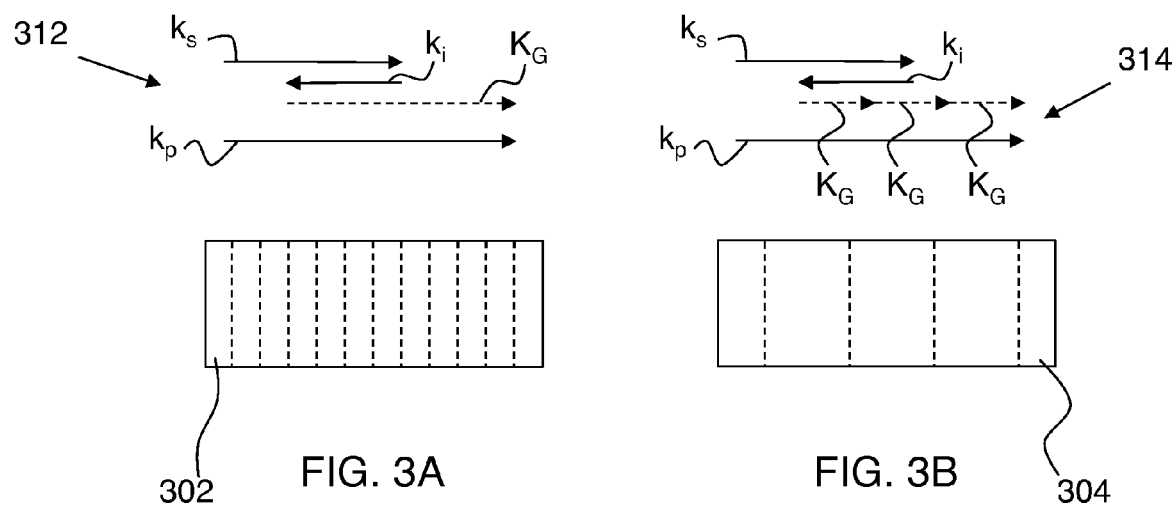
FIG. 3A
FIG. 3B

ULTRABRIGHT LONG BIPHOTON GENERATION WITH NON-LINEAR OPTICAL MATERIAL

CROSS REFERENCE TO RELATED APPLICATIONS

This application claims the benefit of U.S. provisional patent application 61/635,772, filed on Apr. 19, 2012, and hereby incorporated by reference in its entirety.

GOVERNMENT SPONSORSHIP

This invention was made with Government support under contract number FA9550-10-1-0055 awarded by the Air Force Office of Scientific Research. The Government has certain rights in this invention.

FIELD OF THE INVENTION

This invention relates to production of biphotons by spontaneous parametric down conversion.

BACKGROUND

In recent years, there has been increasing interest in quantum communication. The basis for quantum communication is the creation of quantum particles (most often photons) in what is known as entangled states. Two particles are in an entangled state if measurements of their properties (e.g., time of arrival, energy, spin, polarization, etc.) are statistically correlated. One simple example is spin correlation, where if particles A and B are entangled with opposite spin, then spin measurements of A and B tend to produce opposite results (i.e., the measured spins of A and B are correlated).

It is important to note that these quantum correlations can be measured even if the measurements on A and B are performed at locations separated arbitrarily far away from each other. Thus the presence of entangled state correlations in such cases demonstrates a peculiar quantum non-locality. The exploitation of such quantum non-locality for practical purposes is the main focus of quantum communication.

Quantum communication is thus seen to rely on a source of particle pairs in suitable entangled states. One source of entangled photon pairs (often referred to as biphotons) that has been investigated is spontaneous parametric down conversion (SPDC), where a pump photon splits into a signal photon and an idler photon in a nonlinear optical medium. The signal and idler photons are entangled. However, practical application of SPDC for producing biphotons has been hampered by several factors, including excessive biphoton line width and low source brightness. Accordingly, it would be an advance in the art to alleviate these issues.

SUMMARY

Quantum information processing often relies on the properties of entangled 2-photon states, often referred to as biphotons. Thus, sources of biphotons are of considerable interest for such applications. Presently, the most widely used source of biphotons is forward wave spontaneous parametric down conversion (SPDC) in nonlinear crystals, where a pump photon splits into two co-propagating photons (referred to as signal and idler) of lower frequency. However, this process typically results in biphoton linewidths on the order of THz, which is too broad to efficiently interact with atoms. This bandwidth can be reduced by resonating the signal and idler in a resonant cavity, but external mode filtering has been needed to provide a single mode output in demonstrations to date.

The present approach provides biphoton generation having reduced linewidth. Two main approaches are considered:

1) Forward wave SPDC in a monolithic signal and idler resonator. No external mode filtering is needed to provide single mode operation. Use of a monolithic resonator increases the cluster spacing (the frequency spacing of doubly resonant modes). Double pass pumping and type II phase matching can also be employed to narrow the gain linewidth, in order to achieve the desired condition that cluster spacing is greater than the gain linewidth, thereby enabling single-mode operation. In one example, the end faces of the crystal are spherically polished and deposited with high reflection coatings at the signal and idler wavelengths, which form a monolithic cavity that resonates both the signal and idler frequencies. One end face is also deposited with a high reflection coating at the pump wavelength for implementing a double-pass pump.

The pump power is well below the threshold of optical parametric oscillation such that the generation rate of biphotons is small compared to the inverse of the biphoton temporal width. The pump, signal, and idler frequencies are type-II phase matched to obtain a narrow gain width. The use of the monolithic crystal, type-II phase matching, and the double-pass pump allows the gain width of the parametric interaction to be narrower than the spacing of the lined-up signal-idler cavity longitudinal modes. Single-mode long biphotons are therefore generated without the need of external mode filtering. The absence of external mode filtering increases the generation rate and the spectral brightness of the source.

2) Backward wave SPDC in a signal and idler resonator. This process is similar to forward wave SPDC, except that the signal and idler photons are oppositely propagating when they are generated by splitting the energy of individual pump photons. This process has a narrow gain linewidth, so the output desirably tends to be single mode. Phase matching this process can be obtained by appropriate quasi phase-matching of the nonlinear crystal.

3) A third aspect of this work is the production of polarization entangled biphotons. This can be accomplished by using quasi phase-matching with two different periods, such that two SPDC processes are simultaneously phase matched. The first process has ordinary signal and extraordinary idler, and the second process has extraordinary signal and ordinary idler. When these two processes are enabled by the same pump, the resulting signal and idler biphotons have polarization entanglement. This approach for providing polarization entanglement can be practiced in connection with either forward-wave SPDC or with backward-wave SPDC.

This approach has various applications. One may envision the use of monolithic down-converters described herein to allow the quantum repeater protocol with one wavelength in the telecommunication band and one wavelength that accesses a storage medium. For example a 525 nm pumped source could readily be designed with wavelengths at 1.55 μm and 0.8 μm. The 1.55 μm photons would travel through fibers to a distant beam splitter while the nominally 0.8 μm photons would be incident on nearby atomic ensembles. Efficient storage and extraction both require narrow band photons as described here. This monolithic source might also be used for generating conditional long single photons that may be amplitude or phase modulated by high-speed light modulators, or in the future might be used to generate multiphoton entanglement using interferometers with moderate stability.

The present approach provides significant advantages. The existing methods of generating long biphotons can be divided into three categories:
(A) using cold atoms and cavity quantum electrodynamics
(B) using cold atoms and electromagnetically induced transparency, and
(C) using cavity-enhanced spontaneous parametric down-conversion followed by external passive filtering.

Comparing to method A, our device does not need complex techniques such as laser cooling of atoms to sub-millikelvin temperatures, or optical and magnetic trapping of cold atoms, and ultrahigh vacuum systems. Our method requires only a single nonlinear crystal operating near room temperature and a pumping laser with low power. Our device is therefore more compact and practical.

Comparing to method B, which requires similar apparatus as that of method A, our method is also more compact.

Comparing to method C, our device does not require an additional Fabry-Perot cavity that is locked to a resonant cavity (with the nonlinear crystal placed inside). Our device uses the monolithic design to integrate the resonant cavity with the nonlinear crystal, therefore greatly reducing the complexity of the setup and increasing the stability of the system. Together with the double-pass pump, our method results in direct single-longitudinal-mode biphotons.

Several variations are possible, including:
(1) The resonant cavity can be implemented by two curved or plane mirrors with high reflection coating at the signal and idler wavelengths.
(2) Quasi-phase matching with two poling periods can be used to generate long polarization entangled photons.
(3) For generation of non-degenerate long biphotons, type-I phase matching can be used.
(4) The bulk nonlinear crystal can be replaced by a waveguide structure of the same material.

BRIEF DESCRIPTION OF THE DRAWINGS

FIGS. 2A-B show alternatives for a backward-wave SPDC source of biphotons.

FIGS. 3A-B show an example of higher-order quasi-phase-matching.

DETAILED DESCRIPTION

This description has three sections. The first section provides some general principles relating to embodiments of the invention. The second section provides an experimental demonstration of biphoton production using forward-wave SPDC in a monolithic resonator having a double pass pump. The third section provides theoretical calculations relating to biphoton production using backward-wave SPDC in a resonator.

General Principles

Figure 1:
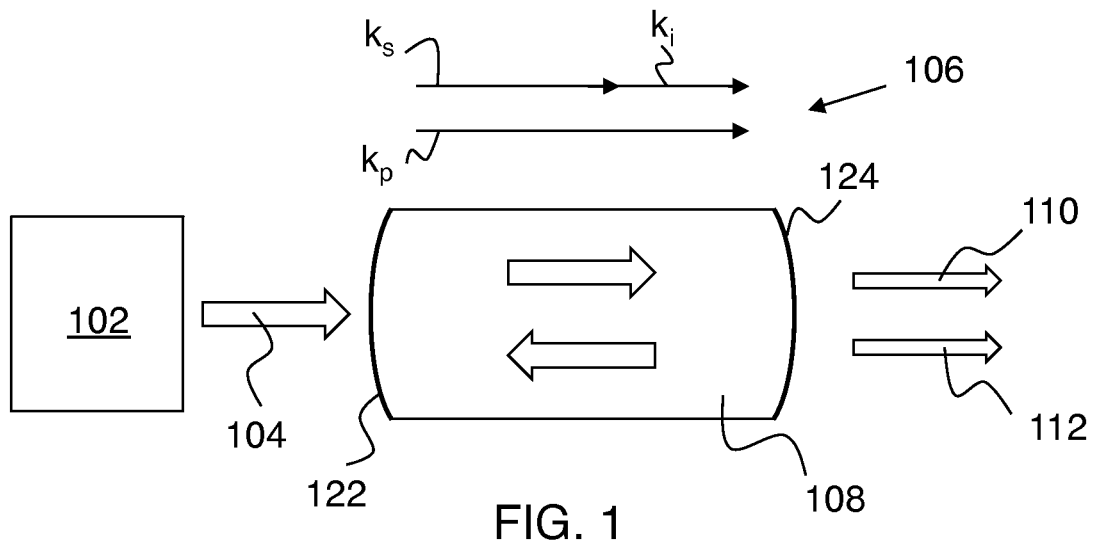
FIG. 1 shows a forward-wave SPDC source of biphotons.

FIG. 1 shows an exemplary embodiment of the invention. In this example, a source of pump radiation 102 provides pump radiation 104 to a nonlinear optical medium 108. Nonlinear optical medium 108 is configured to provide phase-matched spontaneous parametric down-conversion (SPDC) of the pump radiation 104 to provide co-propagating signal radiation and idler radiation. This phase matching is shown on phase matching diagram 106, where $k_p$ is the pump k-vector, $k_s$ is the signal k-vector, and $k_i$ is the idler k-vector. Phase matching is shown by $k_s+k_i=k_p$, and the co-propagation of signal and idler is shown by $k_s$ and $k_i$ pointing in the same direction.

Two endfaces (122 and 124) of nonlinear optical medium 108 are coated to reflect both the signal radiation and the idler radiation. Endfaces 122 and 124 have endface curvatures such that a monolithic optical resonator is formed for both the signal radiation and the idler radiation in nonlinear optical medium 108. Thus, signal radiation 110 and idler radiation 112 are emitted from this resonant cavity in operation.

Source 102 is configured to provide the pump radiation 104 at an intensity that is less than the pump intensity threshold for optical parametric oscillation in the nonlinear optical medium. As indicated above, this source provides entangled photon pairs (referred to as biphotons). Preferably, the coating on endface 124 also reflects the pump radiation, thereby providing a double pass of pump radiation 104 inside nonlinear medium 108, as shown on FIG. 1.

Practical applications of biphoton sources often require high spectral brightness of the biphotons, combined with narrow linewidth (or equivalently, a long correlation time). The preferred embodiment of FIG. 1 has several features that contribute to providing these desirable properties. Making both the signal and idler resonant facilitates single-mode operation, since the effective longitudinal mode spacing is the cluster spacing (described in detail below), which is significantly larger than the longitudinal spacing of either the signal modes or the idler modes. The use of a double pass pump configuration effectively increases the interaction length by a factor of two, thereby decreasing the linewidth of the SPDC interaction. The use of a monolithic resonator simplifies operation significantly by reducing the number of cavity parameters that can vary independently of each other. Thus, a monolithic double resonator can be stably tuned by simply altering the temperature, while stable tuning of a non-monolithic double resonator tends to be much more complicated to perform, with stable operation often requiring elaborate measures such as multiple feedback control loops.

Practice of the invention does not depend critically on the relative polarization of the signal and idler radiation. The signal and idler can have parallel polarization (type I phase-matching), or they can have orthogonal polarization (type-II phase matching). Type-II phasematching tends to lead to a narrower line width for SPDC, and is preferred for that reason.

Practice of the invention also does not depend critically on the signal frequency and idler frequency. The signal radiation and the idler radiation can have the same frequency (degenerate SPDC) or can have different frequencies (non-degenerate SPDC). In all cases, energy conservation requires that $f_p=f_s+f_i$ for pump frequency $f_p$, signal frequency $f_s$ and idler frequency $f_i$. In practice, non-degenerate SPDC is often performed in a nearly degenerate configuration, where the signal and idler frequencies are approximately but not exactly equal. Temperature tuning of SPDC to approximately match the signal and idler frequencies can provide this nearly degenerate SPDC.

Preferably source 102 provides pump radiation 104 in a single mode. More specifically, it is most preferred for pump radiation 104 to be in a single transverse mode and also in a single longitudinal mode. In some cases, a source 102 that provides pump radiation 104 in a single transverse mode but multiple longitudinal modes can be employed.

Figure 2A:
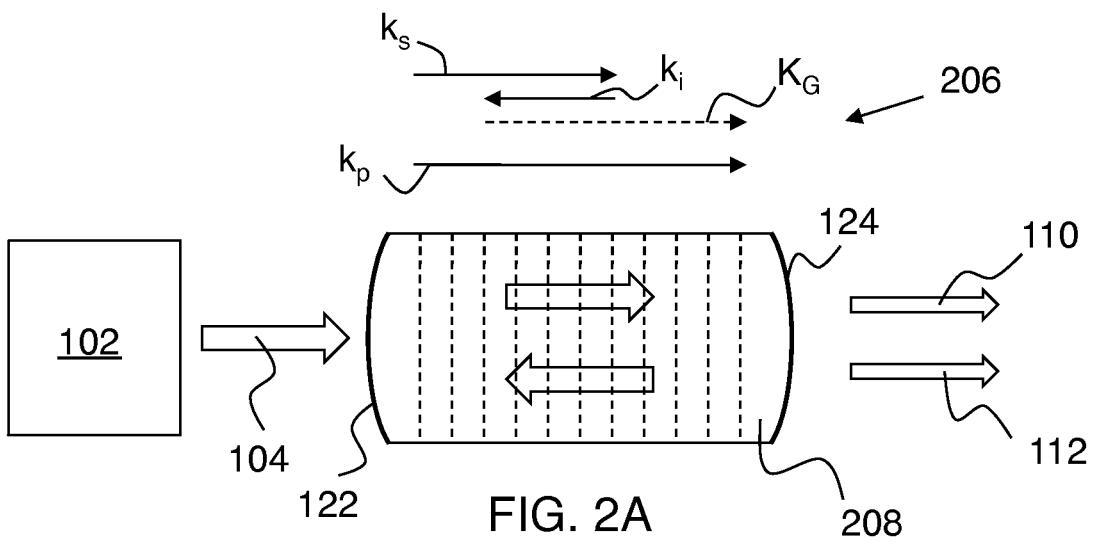

FIGS. 2A-B show alternatives for a backward-wave SPDC source of biphotons. The example of FIG. 2A is like the example of FIG. 1, except that phase matching is for a backward-wave SPDC interaction. The phase matching diagram for this case is referenced as 206, where nonlinear medium 208 includes periodic quasi phase-matching structures (dashed lines) that give rise to a grating momentum vector $K_G$. Here phase matching is shown by $k_s-k_i+K_G=k_p$, and the counter-propagation of signal and idler is shown by $k_s$ and $k_i$ pointing in opposite directions. As in the example of FIG. 1, end faces 122 and 124 have coatings that reflect both the signal and idler. Signal radiation 110 and idler radiation 112 are emitted from this resonant cavity in operation. As in the example of FIG. 1, source 102 here is configured to provide pump radiation 104 at an intensity that is less than the pump intensity threshold for optical parametric oscillation in the nonlinear optical medium.

The example of FIG. 2A shows a monolithic double resonator as in the example of FIG. 1. As described in greater detail below, the line width of backward-wave SPDC is significantly narrower than the line width of forward-wave SPCD, which makes the design of a backward-wave SPDC biphoton source considerably more forgiving in terms of providing single mode operation. For example, one could consider a single pass pump and a non-monolithic resonator as in the example of FIG. 2B. Here mirrors 212 and 214 form a non-monolithic resonator for both the signal and idler, but mirror 214 does not reflect pump radiation 104. Nonlinear medium 210 includes its quasi phase-matching structures, but need not have coated end faces.

For backward-wave SPDC biphoton sources, the signal and idler can have parallel polarization, or they can have orthogonal polarization (type-II phase matching). Type-II phasematching tends to lead to a narrower line width for SPDC, and is preferred for that reason. The signal radiation and the idler radiation can have the same frequency (degenerate SPDC) or they can have different frequencies (non-degenerate SPDC). In all cases, energy conservation requires that $f_p=f_s+f_i$ for pump frequency $f_p$, signal frequency $f_s$ and idler frequency $f_i$.

In general, any technique for providing phase matching can be employed to provide phase matching for forward-wave and backward-wave SPDC biphoton sources. The main techniques for phase matching are birefringent phase matching and quasi phase-matching. Birefringent phase matching relies on the properties of birefringent crystals (i.e., different polarizations have different phase velocities) to provide phase matching for suitably chosen polarizations of pump, signal and idler. Quasi phase-matching (QPM) is based on periodically modulating a property of the nonlinear medium (e.g., the sign of the nonlinear coefficient) with a periodicity that provides a grating k-vector that effectively makes up the difference between $k_p$ and $k_s+k_i$ (forward wave SPDC) or $k_s-k_i$ (backward wave SPDC).

As is apparent from the schematic diagrams of FIG. 2A-B, QPM for backward-wave SPDC tends to require large grating k-vectors (much larger than the grating k-vectors that would be needed for QPM of forward-wave SPDC). The grating period is inversely proportional to the grating k-vector, so as this k-vector increases, the grating period decreases. The technical difficulty of fabricating QPM structures tends to increase as the period decreases. In fact, providing phase matching of backward-wave SPDC is the main difficulty to be expected in building such a source in practice.

One approach for alleviating this difficulty is shown on FIGS. 3A-B. On FIG. 3A, the QPM structures have a small period 302 and a corresponding large grating k-vector $K_G$ that phase matches the backward wave interaction of phase matching diagram 312. However, it may be difficult to fabricate a structure having period 302. FIG. 3B shows higher order phase matching of the same interaction. Here, the period 304 is three times larger than on FIG. 3A, so the corresponding grating vector $K_G$ is three times smaller, as shown on phase matching diagram 314. However, it is permissible on a phase matching diagram to use an odd multiple of $K_G$ to provide phase matching (here we see that if this multiple is 3, phase matching will be achieved). Grating k-vectors can contribute to the phase matching in either direction (geometrically) or with either sign (algebraically). Thus, the general equation for QPM of forward wave SPDC is $k_s+k_i-k_p=\pm mK_G$. For backward wave SPDC we have $k_s-k_i-k_p=\pm mK_G$. Here m is an odd integer (i.e., 1, 3, 5 etc.), and $K_G$ is the grating vector corresponding to the grating period. Preferably, the order m is as small as practically feasible, since efficiency scales as $1/m^2$.

Figure 4:
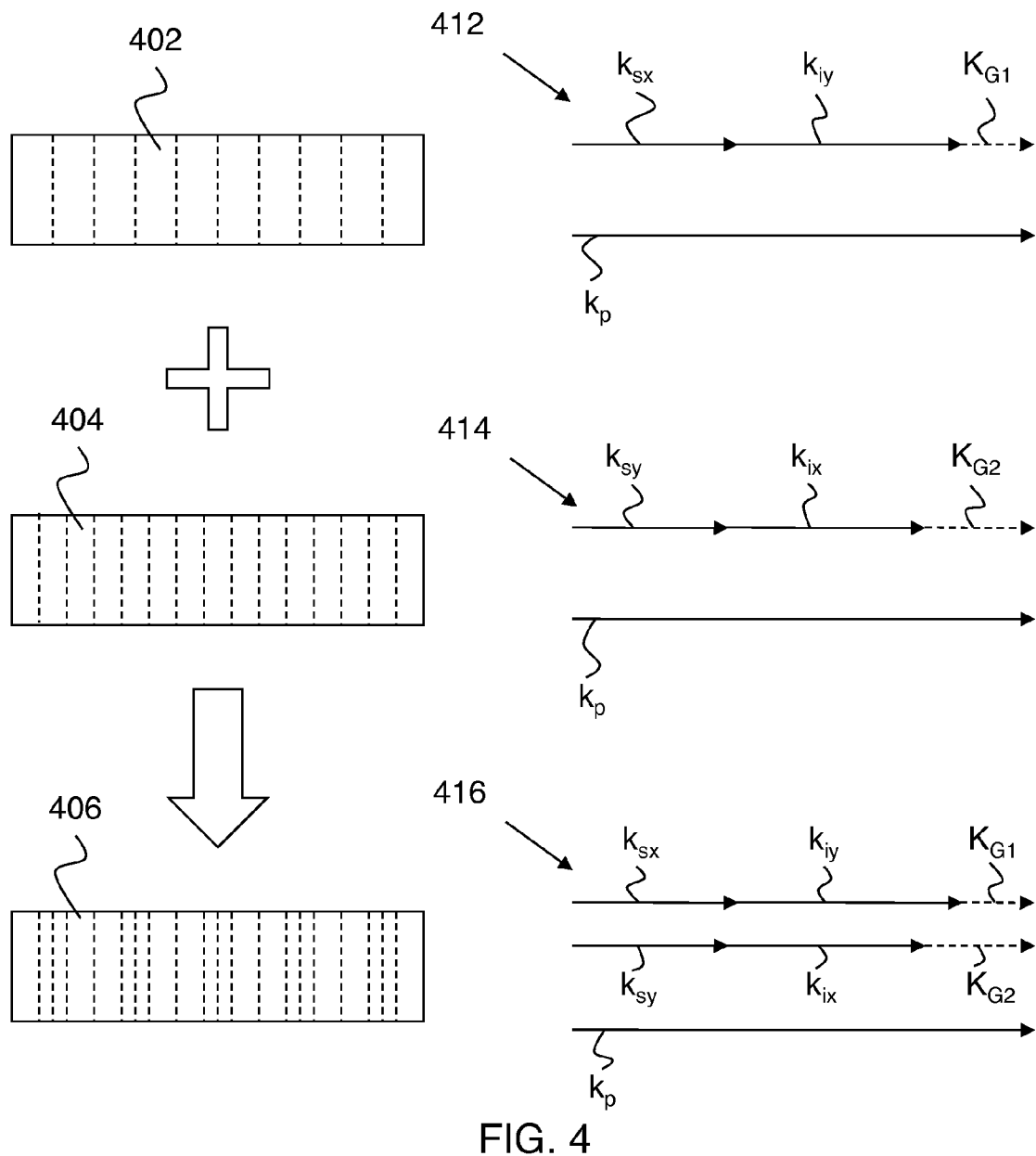
FIG. 4 shows an example of quasi-phasematching for providing polarization entangled biphotons.

The biphoton sources as considered above provide biphotons that have energy-time entanglement. For some applications, it is desirable for the biphotons to also have polarization entanglement. FIG. 4 shows an example of quasi-phase-matching for providing polarization entangled biphotons. In this example, we suppose that QPM structure 402 provides phase matching of $k_{sx}$ and $k_{iy}$ to $k_p$ with a grating k-vector $K_{G1}$. Here sx refers to a first signal mode and iy refers to a second idler mode. These signal and idler modes are orthogonally polarized, as schematically shown by the x and y subscripts The interaction of a y-polarized signal and x-polarized idler would in general have a different phase matching condition. The phase matching diagram for this case is schematically shown as 414 on FIG. 4, where sy is the second signal mode and ix is the first idler mode. A grating k-vector $K_{G2}$ phase matches this interaction, and has a corresponding period 404.

It is possible to fabricate a QPM structure having both periods 402 and 404. The result is schematically shown as 406, with corresponding phase matching diagram 416. Here the signal radiation includes a first signal mode (sx) and a second signal mode (sy) having the same frequency and orthogonal polarization. Similarly, the idler radiation includes a first idler mode (ix) and a second idler mode (iy) having the same frequency and orthogonal polarization. The first signal mode (sx) and the first idler mode (ix) have parallel polarization. The nonlinear optical medium includes quasi phase-matching structures that simultaneously phase match SPDC to provide the first signal mode and the second idler mode (i.e., sx and iy) and SPDC to provide the second signal mode and the first idler mode (i.e., sy and ix). The resulting output radiation has polarization entangled biphotons because there are two interfering quantum processes that contribute to the polarization of the biphotons.

To summarize, an exemplary device for generating narrow-band polarization-entangled photons can include a monolithic periodically poled nonlinear crystal with two periodicities. The two periodicities simultaneously allow the parametric down-conversion process where the signal is an ordinary wave and the idler is extraordinary and the process where the signal is extraordinary and the idler is ordinary. As the two processes are indistinguishable, the signal and idler photons are generated in a polarization-entangled state. The end faces of the crystal are preferably polished and deposited with high-reflection coatings at the signal and idler wavelengths to realize a monolithic resonator that increases the cluster spacing. One end face is also preferably deposited with a high-reflection coating at the pump wavelength to double pass the pump. The double-pass pump and the type-II phase matching can reduce the gain linewidth to within the cluster spacing so that single-mode operation is achieved.

Figure 5:
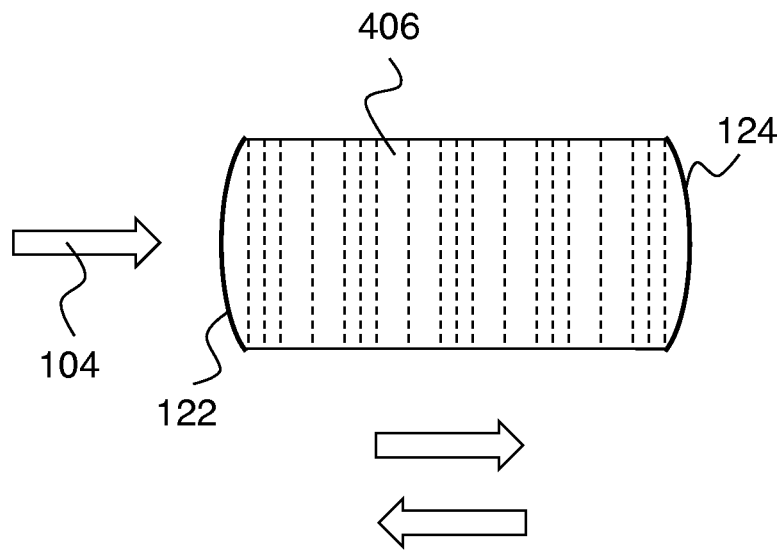
FIG. 5 shows a nonlinear optical crystal configured for providing polarization entangled biphotons.

FIG. 5 shows a nonlinear optical crystal configured along these lines. Here 406 schematically shows QPM with two periods, and end faces 122 and 124 are coated to reflect both the signal and idler. In addition, end face 124 is coated to reflect incident pump radiation 104 to provide a double pass of the pump, as shown.

Figure 6:
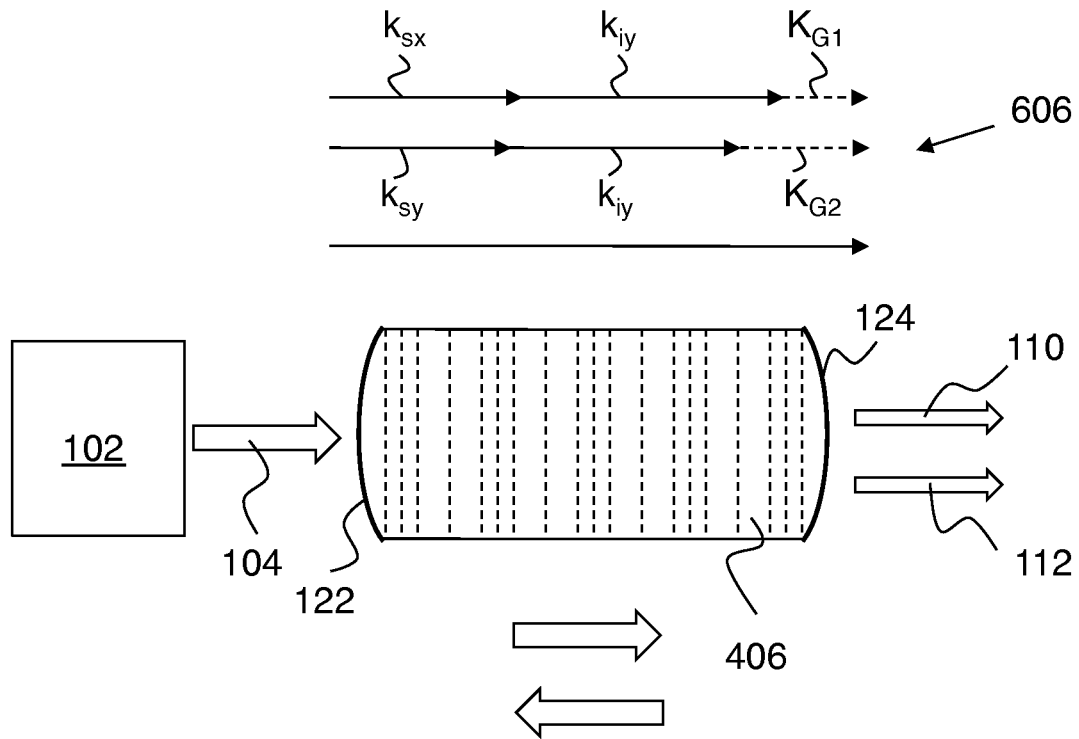
FIG. 6 shows a forward-wave SPDC source of polarization entangled biphotons.

FIG. 6 shows a forward-wave SPDC source of polarization entangled biphotons. This example is similar to the example of FIG. 1, except that QPM 406 having two periods is present, leading to the phase matching diagram of 606.

Figure 7:
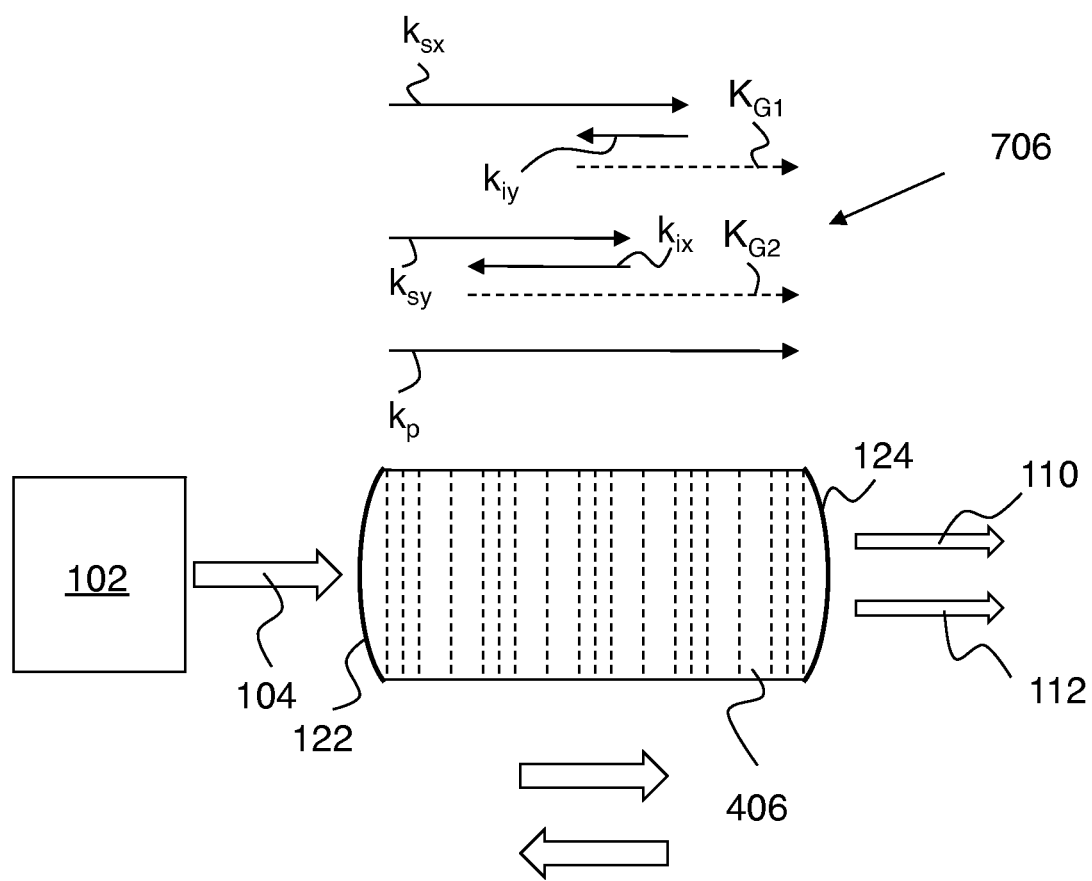
FIG. 7 shows a backward-wave SPDC source of polarization entangled biphotons.

FIG. 7 shows a backward-wave SPDC source of polarization entangled biphotons. This example is similar to the example of FIG. 2A, except that QPM 406 having two periods is present, leading to the phase matching diagram of 706.

A) Forward Wave SPDC Experiment

Ultrabright sources of temporally long and spectrally narrow photons are necessary for the realization of quantum networks where efficient interaction of light and matter at the single-photon level is essential [A1]. Today, generation of such photons can be realized by using cold atoms and the techniques of cavity quantum electrodynamics [A2-A5] and electromagnetically induced transparency [A6-A7]. They may also be generated by using cavity-enhanced parametric down conversion followed by locked passive filtering [A8-A11]. However the complexity of previous sources make them difficult, if not impossible, to scale up for quantum networks that have many nodes and require many generators [A12]. In this Letter we report an ultrabright source of long biphotons that uses a monolithic doubly resonant parametric down-converter without external filtering. At 700 μW of pump power we obtain a biphoton correlation time of 17.1 ns with a generation rate of $1.10 \times 10^5$ photons/(s mW), a generated spectral brightness of $1.34 \times 10^4$ photons/(s MHz mW), and a count rate at the detector of 527 biphotons/(s mW).

Spontaneous parametric down conversion (SPDC) as usually practiced makes use of a forward-wave interaction where a pump photon splits into co-propagating signal and idler photons. The bandwidth of the biphotons is determined by the phase matching condition and thus the gain linewidth of the parametric interaction. For non-degenerate photons, it is $\Delta\omega_G \approx 1.77\pi/(|v_s^{-1} - v_i^{-1}|L)$, where $v_s$ and $v_i$ are the group velocities of the signal and idler photons and L is the length of the nonlinear crystal. For a KTP crystal with a length of 10 mm and type-II phase matching, the gain linewidth is about 4.66 cm$^{-1}$ or 140 GHz. Because the linewidth of a strong radiative transition in an alkali metal is about 10 MHz, the bandwidth of these photons is about $10^4$ times larger than that required for efficient interaction.

To reduce the photon bandwidth and increase the spectral brightness, one can resonate the signal and idler fields of the SPDC process with an external optical cavity [A13-A15] to generate multi-longitudinal mode biphotons. One may then obtain a single-mode output by using additional spectral filtering [A8,A10-A11]. Using this technique with periodically poled KTP, Benson and colleagues [A8] have attained a count rate of 1000 biphotons/(s mW).

SPDC using a backward-wave interaction has also been suggested as a method to generate bright and temporally long biphotons [A16, see also section B]. Its special feature is its narrow gain linewidth equal to $1.77\pi/(|v_s^{-1} + v_i^{-1}|L) \approx 0.026 \Delta\omega_G$. But realization of a backward-wave biphoton generator requires a KTP crystal that is periodically poled with a sub-micron periodicity; even with current structuring techniques [A17] this remains quite challenging.

Figure 8:
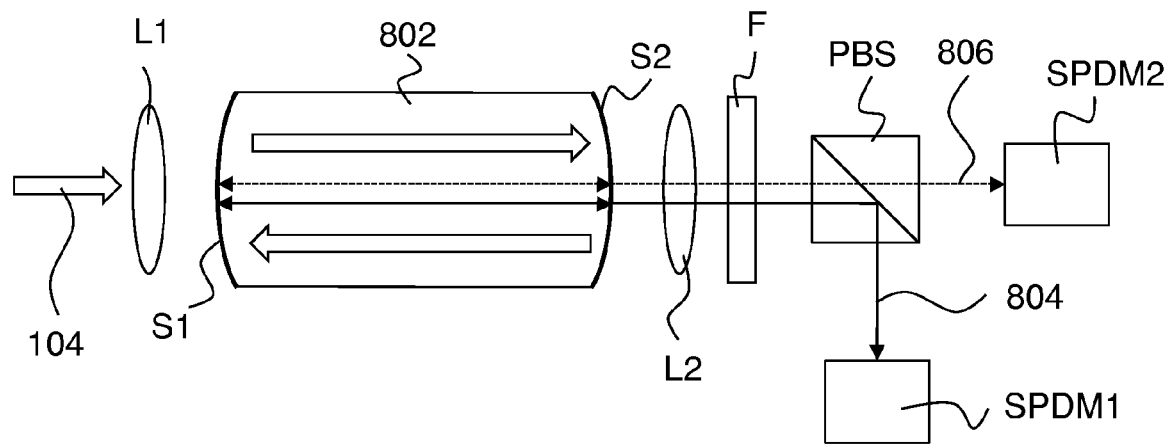
FIG. 8 shows an experimental arrangement relating to production of biphotons by forward-wave SPDC in a monolithically resonant structure having a double-pass pump.

In the present work, we demonstrate a monolithic doubly resonant parametric down-converter without external filtering. A schematic is shown in FIG. 8. This biphoton source includes a periodically poled KTP crystal 802 with spherically polished and coated end faces S1 and S2. So that the pump is double passed, the end face S2 is also coated at the 532 nm pump wavelength. Orthogonally polarized signal photons 804 and idler photons 806 are separated by a polarizing beam splitter (PBS) before detection by single-photon detection modules, SPDM1 and SPDM2. Long-pass and band-pass filters (F) are used to remove the pump and spurious fluorescence. Lenses L1 and L2 are used to focus the pump 104 into the crystal and to collimate the signal and idler beams.

We use a 10-mm long PPKTP crystal with spherically polished end faces (radii of curvature of about 10 mm). Both end faces are deposited with a high reflection coating at the signal and idler wavelengths so as to form a monolithic cavity at both frequencies. The finesse of the cavity is approximately 660. The pump is a single-frequency cw laser at 532 nm (linewidth<5 MHz and power stability of ±1%) and is tightly focused into the crystal. To implement double-pass pumping, one end face of the crystal is also deposited with a high reflection coating at the pump wavelength. Operating at 28° C., with a temperature stability of better than 0.5 mK, and a few mW of pump, we generate collinear, orthogonally polarized signal and idler photons near degeneracy. This approach, and the calculations that follow, are motivated by both the backward wave calculations [A16], and earlier work that uses a monolithic design to obtain parametric oscillation in a single longitudinal mode [A18].

In order to obtain single mode operation without the need for filtering, the spacing of signal modes which are simultaneously resonant at the idler must be larger than the gain linewidth.

Figure 9:
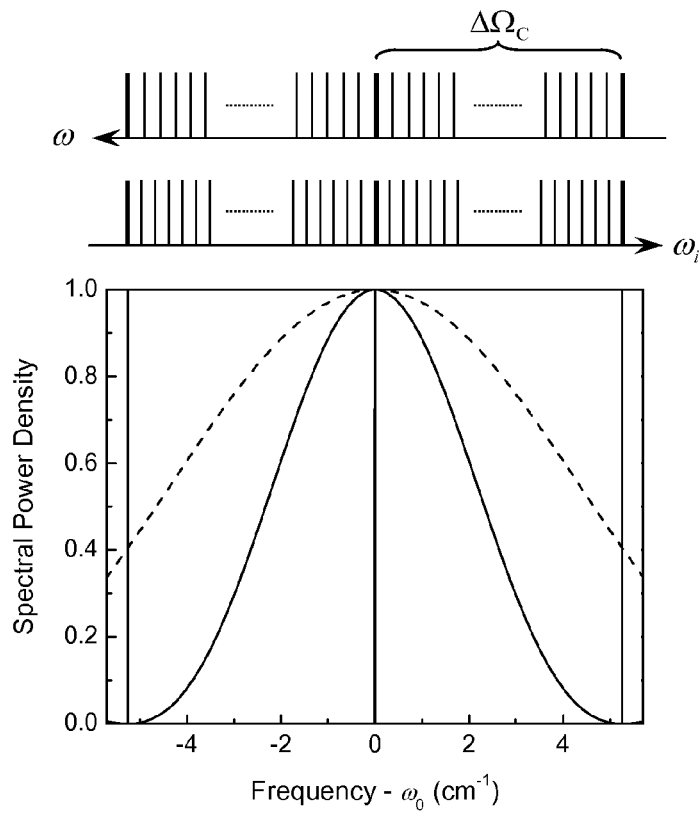
FIG. 9 shows mode cluster spacing relating to the experiment of FIG. 8.

FIG. 9 shows cluster spacing and gain linewidth. The top panel illustrates the signal and idler modes increasing in opposite directions. The signal and idler resonances that line up vertically (heavy lines) are resonant at both the signal and the idler wavelengths. The bottom panel shows the calculated gain curve for SPDC with a double-pass pump (solid curve) and with a single-pass pump (dashed curve). The central cluster frequency (central vertical line) is taken as the center frequency of the gain curve $\omega_0$. Single-mode output is achieved when there is only one doubly resonant mode under the gain curve.

More specifically, FIG. 9 shows a comb of signal modes and a comb of idler modes where the mode spacing at the idler frequency $\Delta_i$ is slightly less than the mode spacing at the signal frequency $\Delta_s$. Every so often, a signal mode and an idler mode line up and are doubly resonant. Following the earlier literature [A19], we term the frequency spacing of these doubly resonant modes as the cluster spacing $\Delta\Omega_C$. With the approximation that the mode spacing at the signal $\Delta_s$ and the idler frequency $\Delta_i$ are independent of frequency (no group velocity dispersion), the mode spacings of the signal and idler modes are related to their group velocities $v_{s,i}$ and the cavity length l by $\Delta_{s,i}=(2p)v_{s,i}/(2l)$. The cluster spacing is obtained by noting that since the difference of the mode spacings at the signal and idler is $(\Delta_s-\Delta_i)$, then a doubly resonant mode will occur after N idler modes, where $N\approx\Delta_s/(\Delta_s-\Delta_i)$. The cluster spacing at the signal frequency is then $N\Delta_i$ or $$\Delta\Omega_C \cong \frac{\Delta_s \Delta_i}{\Delta_s - \Delta_i} \quad (A1)$$

We use Type II phase matching to increase the difference between the group velocities at the signal and idler wavelengths to thereby narrow the gain linewidth. To further narrow this linewidth, by what turns out to be an important factor of two, the pump is double passed (FIG. 9) to effectively double the length of parametric interaction. To make the common cavity length as short as possible and to thereby increase the cluster spacing, we use a monolithic cavity. These ingredients, i.e., a monolithic cavity, type II phase matching, and double pass pumping work together to allow generation of single mode biphotons at both degenerate and non-degenerate frequencies. In our experiment, the biphoton source is operated near degeneracy for maximum detector efficiency. The full width half power gain linewidth is 4.66 cm$^{-1}$ and the cluster spacing is 5.26 cm$^{-1}$.

Following the methodology of Chuu and Harris [A16], with $a_s^\dagger(\omega)$ and $a_s(\omega)$ denoting the signal frequency-domain operators, the spectral power density at the signal frequency is $$S(\omega) = \int_{-\infty}^{\infty} \langle a_s^\dagger(\omega)a_s(\omega')\rangle \exp[i(\omega-\omega')t]\,d\omega' \quad (A2)$$

$$= \frac{8\gamma_s\gamma_i\kappa^2}{\pi[4(\omega-\Omega_q)^2+\Gamma_s^2][4(\omega_i-\Omega_r)^2+\Gamma_i^2]}$$

and the bandwidth of the generated biphotons is $\Delta\omega=[(\sqrt{\Gamma_s^4+6\Gamma_s^2\Gamma_i^2+\Gamma_i^4}-\Gamma_s^2-\Gamma_i^2)/2]^{1/2}$. With r denoting the mirror reflectivity and $\xi_{s,i}$ as the single-pass power loss of the crystal, the output coupling rates are $\gamma_{s,i}=\Delta_{s,i}(1-r)$ and the total cavity decay rates are $\Gamma_{s,i}=2\xi_{s,i}\Delta_{s,i}+\gamma_{s,i}$. $\kappa$ is the parametric coupling constant and $\Omega_q=q\pi v_s/l$ is the cold cavity frequency, where q is an integer.

With $a_s^\dagger(t)$ and $a_s(t)$ as the signal time-domain operators, the biphoton generation rate is given by $\langle a_s^\dagger(t)a_s(t)\rangle$ or $$R = \int_{-\infty}^{\infty} S(\omega')d\omega' = \frac{4\gamma_s\gamma_i\kappa^2}{\Gamma_s\Gamma_i(\Gamma_s+\Gamma_i)} \quad (A3)$$

at perfect phase matching. With $a_i^\dagger(t)$ and $a_i(t)$ as the idler time-domain operators, and $\tau$ equal to the difference in the arrival times of the signal and idler photons, the Glauber correlation function is $$G^{(2)}(\tau) = \langle a_i^\dagger(t+\tau)a_s^\dagger(t)a_s(t)a_i(t+\tau)\rangle \quad (A4)$$

$$= R^2 + \frac{4\kappa^2\Gamma_s\Gamma_i}{(\Gamma_s+\Gamma_i)^2} \times \begin{cases} e^{\Gamma_s\tau} & \text{for } \tau<0 \\ e^{-\Gamma_i\tau} & \text{for } \tau>0 \end{cases}$$

The correlation function is thus characterized by two decay constants, one for $\tau<0$, and the other for $\tau>0$. Each decay constant is determined by the photon that arrives at the detector later in time (i.e., signal photons for $\tau<0$ and idler photons for $\tau>0$). For generation rates that are small as compared to these decay times, the Glauber correlation function can also be expressed in terms of the absolute square of the biphoton wave function as $G^{(2)}(\tau)=|\Psi(t,t+\tau)|^2$. The temporal width of the biphotons is then approximately $T_c=(\ln 2)(1/\Gamma_s+1/\Gamma_i)$.

Experimentally, we find the monolithic down-converter straightforward to align and use. We tune the cavity by adjusting the temperature of the crystal. The calculated change in the wavelength of the center cluster frequency is about 5 GHz per degree. To select the cluster frequency nearest to the center of the gain profile, we adjust the temperature to maximize the intensity of parametric oscillation at a pump power of 50 mW. The oscillation wavelengths of the signal and idler (1063.5 nm and 1064.9 nm) are then measured by a wavemeter (Burleigh). The selected cluster frequency may or may not be at the center of the gain profile. For biphoton measurements we decrease the pump power to a few mW and, using single photon detection modules (id Quantique id400), fine tune the temperature to maximize the biphoton generation rate. On the scale of seconds, the average generation rate fluctuates by about 10% about a mean rate that is stable on a scale of several hours.

We measure the Glauber correlation function by coincidence detection of the signal and idler photons. These photons are first separated by a polarizing beamsplitter and guided to the single-photon detection modules through multimode fibers. A digital time converter (FAST ComTec P7887) measures the coincidence counts as a function of delay. The counts are binned into 125-bin histograms. Accidental coincidence counts, primarily from residual pump (after back-reflection) and spurious fluorescence, are reduced with long-pass and band-pass filters. For a bin width $T_b$, the coincidence rate $R_C(\tau)$ is related to the Glauber correlation function by $G^{(2)}(\tau)=R_C(\tau)/T_b$.

Figure 10:
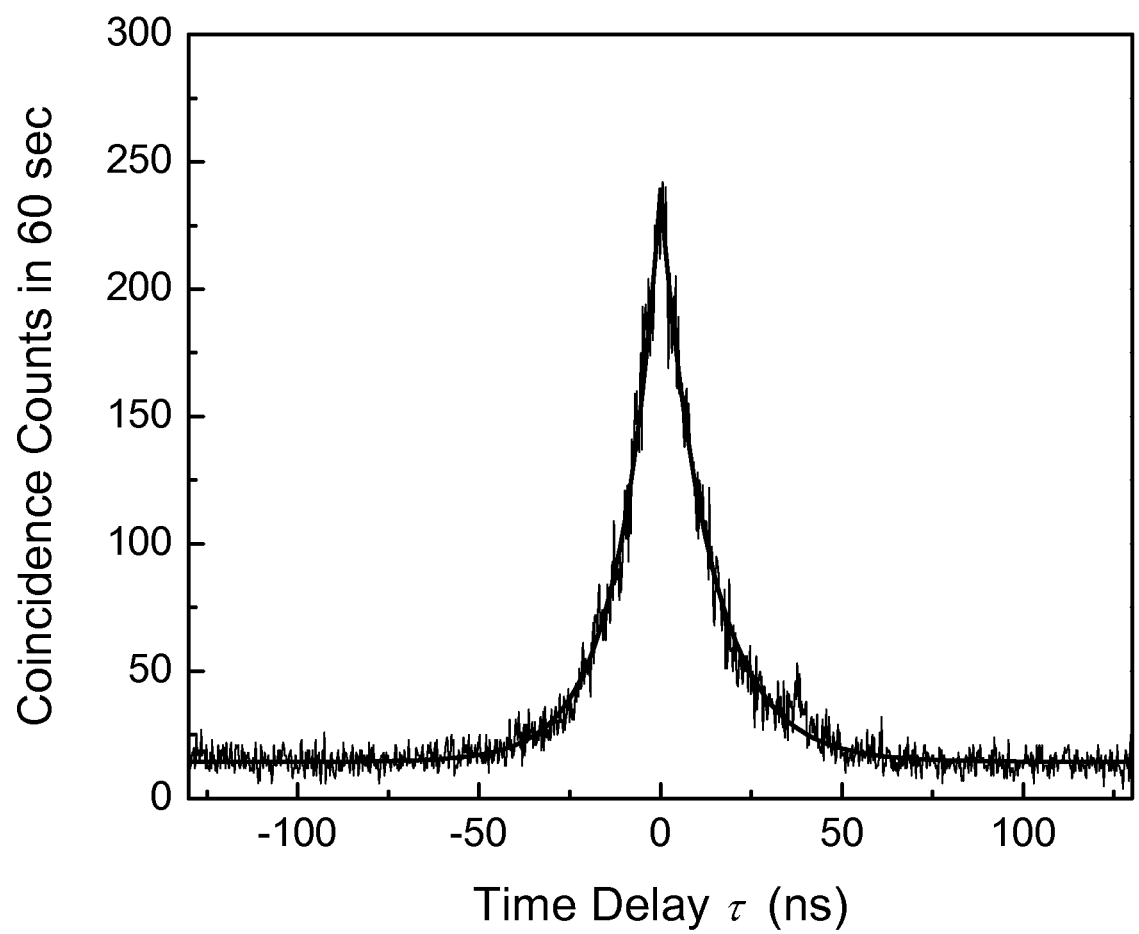
FIG. 10 is a measured Glauber correlation function for the experiment of FIG. 8.

A representative measurement of the correlation function is shown in FIG. 10, where we use a pump power of 700 µW. The coincidence counts are measured as a function of the time delay between the signal and idler photons. By fitting the measured curve with two asymmetric exponential decays for $\tau<0$ and $\tau>0$, we find $1/\Gamma_s=11.33\pm0.12$ ns and $1/\Gamma_i=13.29\pm0.14$ ns. The probable reason for the different decay times is the different reflectivity for the orthogonal polarizations. The correlation time (full width at half maximum) is then $T_C=17.07\pm0.13$ ns. Using Eq. (A2), the bandwidth of the generated biphotons is $\Delta\omega\approx2\pi\times8.3$ MHz.

The biphoton generation rate is obtained by summing the coincidence rates over all time delays and correcting for the quantum efficiency of the detectors (15% and 30% for the signal and idler), filter transmittance (53% in total for each channel), fiber system transmittance (70% and 60% for the signal and idler), and mirror reflectivity (95% in total for each channel). For the measurement of FIG. 10, we obtain an observed coincidence rate of 527 biphotons/(s mW). Correcting for the total collection efficiency, the generation rate and the generated spectral brightness of our biphoton source are $R=1.10\times10^5$ biphotons/(s mW) and $R/\Delta\omega=1.34\times10^4$ biphotons/(s MHz mW).

When the doubly resonant biphoton source is compared to a non-resonant SPDC of the same crystal length and pumping power, the generation rate is increased by a factor of $\eta_r$, where $$\eta_r \approx \frac{8F}{\pi r^{1/2}} \frac{|v_s - v_i|}{(v_s + v_i)} \quad \text{(A5)}$$

and $F \approx \pi r^{1/2}/(1-r)$ is the finesse of both cavities. The spectral brightness is increased by a factor of $\eta_b = \eta_r \Delta\omega_G/\Delta\omega$. For the present experiment the cavity has a finesse of $F \approx 660$, and the enhancement, as compared to a non-resonant down-converter is $\eta_r \approx 40$ for the generation rate and $\eta_b \approx 16,000$ for the spectral brightness.

Time domain measurements, as described in the previous paragraph, are limited by the temporal resolution of the single photon detection modules of 250 psec. Because the spacing (in the frequency domain) of the cluster modes is 5.26 cm$^{-1}$ and is much larger than the inverse of the temporal resolution, observation in the frequency domain is also desirable. Though the intensity of the biphoton source is too low to allow this observation, we have instead operated the generator in the oscillator regime and used a scanning Fabry Perot interferometer (FSR of 2 GHz and spectral resolution of 65 MHz) to determine that only a single mode is oscillating. Though promising, this does not rule out the possibility of biphoton generation in a distant cluster mode that is not discernible by time domain correlation.

To verify that the biphotons are generated in nearly a single transverse mode, we have replaced the multimode fibers used for the time domain measurements with single mode fibers and find that the ratio of the observed biphoton generation rate for the single mode case to that of the multimode case is 0.78.

The monolithic down-converter, as designed, generates time energy entangled photons, but not polarization entangled photons. To produce biphotons that are polarization entangled, while retaining type II phase matching, one may periodically pole the nonlinear crystal with two periodicities that simultaneously allow the parametric process where the signal is an ordinary wave and the idler is extraordinary and the process where the signal is extraordinary and the idler is ordinary [A20].

One may envision the use of monolithic down-converters such as described here to allow the quantum repeater protocol [A12] with one wavelength in the telecommunication band and one wavelength that accesses a storage medium {A21-A24]. For example a 525 nm pumped source could readily be designed with wavelengths at 1.55 μm and 0.8 μm. The 1.55 μm photons would travel through fibers to a distant beam splitter while the nominally 0.8 μm photons would be incident on nearby atomic ensembles. Efficient storage and extraction both require narrow band photons as described here. This monolithic source might also be used for generating conditional long single photons that may be amplitude or phase modulated by high-speed light modulators [A25-A28].

In summary, this work has shown that an appropriately designed doubly resonant monolithic crystal may be used as a parametric down-converter to generate temporally long and spectrally narrow biphotons with exceedingly high spectral brightness. Application to several areas of quantum information processing seems likely. To further increase the biphoton correlation time and the brightness, and reduce the bandwidth, all by a factor of about 2, one could use the monolithic cavity described in Ref. A18 which has a higher finesse of $F=1300$.

B) Backward Wave SPDC Calculation

The parametric interaction of electromagnetic waves where the signal and idler propagate in opposite directions was first suggested by Harris [B1] and has now been extensively studied [B2-B5]. Its special feature is, that because of the internal feedback provided by the backward wave, the interaction becomes temporally unstable at a finite crystal length. For many decades the experimental challenge has been the lack of an appropriate nonlinear material for phase matching. The breakthrough came recently, where by extending the techniques of quasi phase-matching [B6] to sub-micron periodicity [B7, B8], Canalias and Pasiskevicius have demonstrated the first mirrorless optical parametric oscillator [B9].

In this paper we suggest and calculate the properties of parametric down converter where because the parametric interaction is of the backward-wave type, the linewidth for parametric gain and spontaneous emission is about 40 times narrower than for a forward wave interaction. By placing the nonlinear crystal within a resonant cavity, the counterpropagating signal and idler photons are generated in a single longitudinal mode with a linewidth that is less than that of typical radiative transitions, and have a Glauber correlation time greater than 65 ns.

Biphoton sources play a central role in applications of quantum information processing such as linear optical quantum computation (LOQC) [B10] and long distance quantum communication [B11]. Biphotons of subnatural linewidth and long correlation times are particularly desirable for these applications; in part, this is because the subnatural linewidth allows photon entanglement to be stored in atomic ensemble memories [B12]. This is essential for efficient generation of multiphoton entanglement in LOQC [B13, B14] as well as for applications involving quantum repeaters [B15]. The long correlation time also allows interference of independent photon sources, a key element for producing multiphoton entanglement without the need for synchronization [B16].

The most widely used source of biphotons is forward wave spontaneous parametric down-conversion (SPDC) in nonlinear crystals, wherein a pump photon splits into two co-propagating photons of lower frequencies. However, the loose constraint of phase matching results in linewidths that are typically on the order of THz and are too broad to efficiently interact with atoms. Passive filtering with narrowband filters can be employed to reduce the linewidth but, at the same time, decrease the biphoton generation rate. Forward wave SPDC with active filtering has been demonstrated by resonating the signal and idler fields with an optical cavity [B17]. But, because of the broad gain linewidth, multiple cavity modes are resonated simultaneously. Additional spectral filtering, such as an etalon locked to the resonant cavity is thus necessary for obtaining a single-mode output. Narrowband biphotons may also be generated in cold atoms by using the techniques of cavity quantum electrodynamics [B18] or of electromagnetically induced transparency [B19].

Figure 11A:
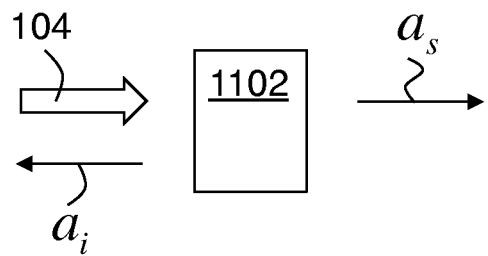
FIG. 11A provides a schematic of backward-wave SPDC.

We develop the theory in the Heisenberg picture. We assume the pump is a monochromatic classical field at frequency $\omega_p$ and take the signal and idler frequencies as $\omega_s=\omega$ and $\omega_i=\omega_p-\omega$. In the absence of a cavity, the configuration is as shown on FIG. 11A, where the operators $a_s$ and $a_i$ denote the signal and idler fields. Here the output of the backward-wave SPDC may be described by the frequency domain operators $a_s(\omega,z)=b_s(\omega,z)\exp[ik_s(\omega)z]$ and $a_i(\omega_i,z)=b_i(\omega_i,z)$ exp[$ik_i(\omega_i)z$], where the operators $b_s(\omega,z)$ and $b_i(\omega_i,z)$ vary slowly with distance z. The coupled equations for $b_s(\omega,z)$ and $b_i^\dagger(\omega_i,z)$ are $$\frac{\partial b_s(\omega, z)}{\partial z} = i\kappa b_i^\dagger(\omega_i, z)\exp[i\Delta k(\omega)z] \quad (B1)$$

$$\frac{\partial b_i^\dagger(\omega_i, z)}{\partial z} = i\kappa b_s(\omega, z)\exp[-i\Delta k(\omega)z],$$

where κ is the coupling constant. With L denoting the crystal length, the quantities $a_s(\omega,L)$ and $a_i^\dagger(\omega_i,0)$ may then be expressed in terms of the vacuum field at the input of the crystal, $a_s(\omega,0)$ and $a_i^\dagger(\omega_i,L)$, $$a_s(\omega,L)=A(\omega)a_s(\omega,0)+B(\omega)a_i^\dagger(\omega_i,L)$$

$$a_i^\dagger(\omega_i,0)=C(\omega)a_s(\omega,0)+D(\omega)a_i^\dagger(\omega_i,L) \quad (B2)$$

The spectral power density [B20] at the signal frequency is $S(\omega)=\int_{-\infty}^{\infty} \langle a_s^\dagger(\omega)a_s(\omega') \rangle \exp[i(\omega-\omega')t]d\omega'$. Noting the commutators $$[a_j(\omega_1,0), a_k^\dagger(\omega_2,0)] = \quad (B3)$$

$$[a_j(\omega_1,L), a_k^\dagger(\omega_2,L)] = \frac{1}{2\pi}\delta_{jk}\delta(\omega_1-\omega_2),$$

$$S(\omega) = \frac{1}{2\pi}|B(\omega)|^2.$$

If the gain is small, the coefficients in Eq. (B2) are given by $$A(\omega) = \exp[ik_s(\omega)L], \quad (B4)$$

$$D(\omega) = \exp[ik_i(\omega_i)L],$$

$$C(\omega) = B^*(\omega)\exp\{i[k_s(\omega) + k_i(\omega_i)]\}, \text{ and}$$

$$B(\omega) = i\kappa L\text{sinc}\left[\frac{\Delta k(\omega)L}{2}\right]\exp\left\{i\left[\frac{\Delta k(\omega)}{2} + k_s(\omega) + k_i(\omega_i)\right]L\right\}.$$

The spectral power density at the signal frequency is then $$S(\omega) = \frac{1}{2\pi}\kappa^2 L^2 \text{sinc}^2[\Delta k(\omega)L/2],$$

where the k-vector mismatch $\Delta k(\omega)\approx(v_s^{-1}+v_i^{-1})\Delta\omega_s$ with $v_s=\partial\omega/\partial k_s(\omega)$ and $v_i=\partial\omega/\partial k_i(\omega_i)$ denoting the group velocities at the signal and idler frequencies, and $\Delta\omega_s$ equal to the detuning of the signal frequency from line center. The gain linewidth for a backward-wave interaction is thus $\Delta\omega_G\approx 1.77\pi/[(v_s^{-1}+v_i^{-1})L]$.

Figure 12:
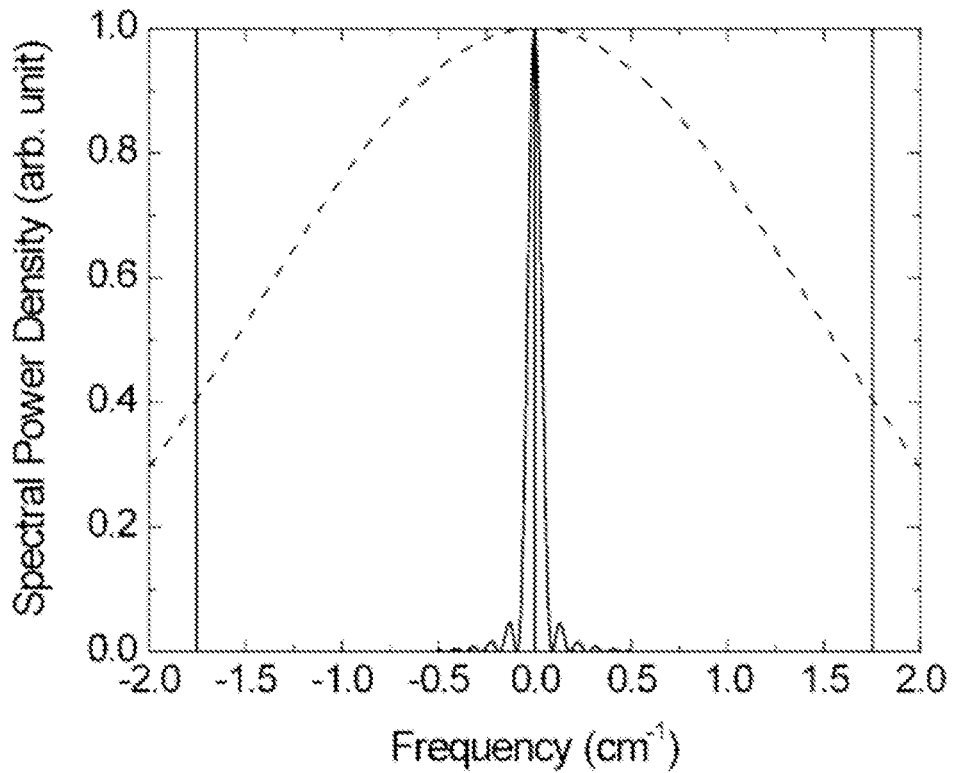
FIG. 12 shows mode cluster spacing relating to the arrangement of FIG. 11B.

If we assume a 3-cm long periodically poled potassium titanyl phosphate (KTP) crystal pumped by 532 nm laser and quasiphase-matched at the degenerate frequency, then $\Delta\omega_G\approx 2\pi\times 0.08$ cm$^{-1}$ or $2\pi\times 2.4$ GHz. As compared to a forward wave interaction in which $\Delta k(\omega)\approx(v_s^{-1}-v_i^{-1})\Delta\omega_s$, the gain linewidth for a backward-wave interaction in a crystal of equal length is reduced by a factor of $(v_s^{-1}+v_i^{-1})/|v_s^{-1}-v_i^{-1}|\cong 38$. FIG. 12 shows this result, where the solid curve is the spectral power density of the backward-wave SPDC and the dashed curve is the spectral power density of forward-wave SPDC. The vertical lines on FIG. 12 denote signal frequencies of adjacent mode pairs of a resonant cavity that are separated by the cluster spacing $\Delta\omega_{Cl}$. The central vertical line is taken at the degenerate frequency.

Figure 11B:
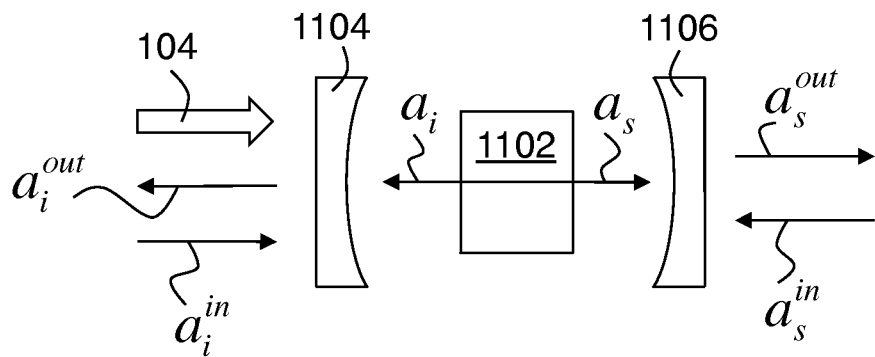
FIG. 11B provides a schematic of backward-wave SPDC in a resonant cavity.

We next consider the case where a nonlinear generating crystal of length L is placed inside a resonant cavity of the same length, as shown on FIG. 11B. Here the operators out $a_{s,i}^{in}$ and $a_{s,i}^{out}$ denote the incident and output fields, respectively. We assume that only a single pair of signal and idler fields coincide with the qth and rth cavity modes. (This single-mode assumption will be justified below). For this cavity case it is convenient to describe the quantum fields by time domain operators $a_s(t,z)=b_s(t)\exp[-i\Omega_q t] \sin(q\pi z/L)$ and $a_i(t,z)=b_i(t)\exp[-i\Omega_r t] \sin(r\pi z/L)$, where $b_s(t)$ and $b_i(t)$ are the fields internal to the cavity and vary slowly with time. $\Omega_q$ and $\Omega_r$ are the cold cavity frequencies. The coupled equations for the slowly varying operators are $$\frac{\partial b_s(t)}{\partial t} + \frac{\Gamma_s}{2}b_s(t) = -i\kappa_1 b_i^\dagger(t) + \sqrt{\gamma_s}\, b_s^{in}(t) \quad (B5)$$

$$\frac{\partial b_i^\dagger(t)}{\partial t} + \frac{\Gamma_i}{2}b_i^\dagger(t) = i\kappa_1 b_s(t) + \sqrt{\gamma_i}\, b_i^{in\dagger}(t)$$

where the envelope quantities $b_s^{in}(t)$ and $b_i^{in\dagger}(t)$ are the fields incident on the resonant cavity, and $\Gamma_s$ and $\Gamma_i$ are the total cavity decay rates. With $E_p$ as the electric field strength of the pump, and with a k-vector mismatch $\Delta k'=k_p-q\pi/L-r\pi/L$, the coupling constant $\kappa_i=\frac{1}{2}d\epsilon_0^2 c^2 \eta_s\eta_i(\omega_s\omega_i)^{1/2}E_p \exp(i\Delta k'L/2)\text{sinc}(\Delta k'L/2)$. With $\gamma_s$ and $\gamma_i$ denoting the output coupling rates, the slowly varying output fields $b_s^{out}(t)$ and $b_i^{out\dagger}(t)$ are output fields $$b_s^{out}(t)=\sqrt{\gamma_s}b_s(t)-b_s^{in}(t)$$

$$b_i^{out\dagger}(t)=\sqrt{\gamma_i}b_i^\dagger(t)-b_i^{in\dagger}(t) \quad (B6)$$

We solve for the output fields by transforming the coupled equations to the frequency domain with the Fourier pair $b(t)=\int_{-\infty}^{\infty}b(\omega')\exp(-i\omega't)d\omega'$ and $$b(\omega') = \frac{1}{2\pi}\int_{-\infty}^{\infty} b(t)\exp(i\omega' t)\,dt.$$

The slowly varying quantities are then converted to fast varying analytic signals (nonzero for positive frequencies) by $a(\omega_{s,i})=b(\omega_{s,i}-\omega_{q,r})$ and $a^\dagger(\omega_{s,i})=b^\dagger(\omega_{s,i}+\omega_{q,r})$. The output fields $a_s^{out}(\omega)$ and $a_i^{out\dagger}(-\omega_i)$ may be written in terms of the incident fields $a_s^{in}(\omega)$ and $a_i^{in\dagger}(-\omega_i)$, $$a_s^{out}(\omega)=A_1(\omega)a_s^{in}(\omega)+B_1(\omega)a_i^{in\dagger}(-\omega_i)$$

$$a_i^{out\dagger}(\omega)=C_1(\omega)a_s^{in}(\omega)+D_1(\omega)a_i^{in\dagger}(-\omega_i) \quad (B7)$$

where for small gain the coefficients are $$A_1(\omega) = \frac{\gamma_s - \Gamma_s/2 + i(\omega - \Omega_q)}{\Gamma_s/2 - i(\omega - \Omega_q)} \quad (B8)$$

$$B_1(\omega) = \frac{-i\kappa_1\sqrt{\gamma_s\gamma_i}}{[\Gamma_s/2 - i(\omega - \Omega_q)][\Gamma_i/2 + i(\omega_i - \Omega_r)]}$$

$$C_1(\omega) = \frac{i\kappa_1\sqrt{\gamma_s\gamma_i}}{[\Gamma_s/2 - i(\omega - \Omega_q)][\Gamma_i/2 + i(\omega_i - \Omega_r)]}$$

$$D_1(\omega) = \frac{\gamma_i - \Gamma_i/2 - i(\omega_i - \Omega_r)}{\Gamma_i/2 + i(\omega_i - \Omega_r)}$$

and, for a lossless cavity are related by unitary conditions.

We use Eq. (B7) and (B8) to derive the spectral and temporal properties of the biphotons. Noting the commutators $$[a_j^{in}(\omega_1), a_k^{in\dagger}(\omega_2)] = [a_j^{in}(\omega_1), a_k^{in}(\omega_2)] = \frac{1}{2\pi}\delta_{jk}\delta(\omega_1 - \omega_2),$$

the spectral power density at the signal frequency [Eq. (B3)] is $$S_1(\omega) = \frac{8\gamma_s\gamma_i\kappa_1^2}{\pi[4(\omega-\Omega_q)^2 + \Gamma_s^2][4(\omega_i-\Omega_r)^2 + \Gamma_i^2]}. \quad (B9)$$

For exact phase matching ($\Delta k'=0$), the biphoton linewidth is $\Delta\omega=[(\sqrt{\Gamma_s^4+6\Gamma_s^2\Gamma_i^2+\Gamma_i^4}-\Gamma_s^2-\Gamma_i^2)/2]^{1/2}$, and the total pair count rate is $$R_1 = \frac{1}{2\pi}\int_{-\infty}^{\infty}|B_1(\omega')|^2 d\omega' = \frac{4\gamma_s\gamma_i\kappa_1^2}{\Gamma_s\Gamma_i(\Gamma_s+\Gamma_i)}. \quad (B10)$$

The Glauber two-photon correlation function is $$G^{(2)}(t_s,t_i) = \langle a_i^{out\dagger}(t_i)a_s^{out\dagger}(t_s)a_s^{out}(t_s)a_i^{out}(t_i)\rangle$$

where $t_s$ and $t_i$ are the arrival times of the signal and idler photons, respectively. Defining the time delay $\tau=t_i-t_s$, the time domain Glauber correlation function may be written as [B20]

$$G^{(2)}(\tau) = \qquad\qquad\qquad\qquad\qquad (B11)$$
$$\left|\frac{1}{2\pi}\int_{-\infty}^{\infty}A_1(\omega')C_1^*(\omega')e^{i\omega'\tau}d\omega'\right|^2 + \left|\frac{1}{2\pi}\int_{-\infty}^{\infty}|B_1(\omega')|^2 d\omega'\right|^2.$$

The second term in Eq. (B11) is independent of $\tau$ and results from accidental two photon events. To the extent that the generation rate of biphotons is small as compared to the inverse of the temporal length of the biphoton, this term may be neglected. The first term in Eq. (B11) then evaluates to $$G^{(2)}(\tau) = \frac{4\Gamma_s\Gamma_i\kappa_1^2}{(\Gamma_s+\Gamma_i)^2} \times \begin{cases} e^{\Gamma_s\tau} & \text{for } \tau<0 \\ e^{-\Gamma_i\tau} & \text{for } \tau>0. \end{cases} \quad (B12)$$

The asymmetry in $\tau$ in Eq. (B12) is due to the order of detection of the signal and idler photons. The photon arriving at the detectors earlier in time triggers the correlation measurement. The shape of $G^{(2)}(\tau)$ is thus determined by the photon arriving later in time. For example, when the idler photon arrives first so that $t_s>t_i$ and $\tau<0$, $G^{(2)}(\tau)$ is determined by the cavity decay rate of the signal photons. The Glauber correlation time (full width at half-maximum) is then $T_c=(\ln 2)(1/\tau_s+1/\Gamma_i)$ and the coherence time [B21] is $1/\Gamma_s+1/\Gamma_i$. With $\Delta_{s,i}$ and $r_{s,i}$ denoting the spacing of the cavity modes and the mirror reflectivity, respectively, the output coupling rate is $\gamma_{s,i}=\Delta_{s,i}(1-r_{s,i})$. With $\xi_{s,i}$ defined as the single pass power loss in the crystal, the total cavity decay rates are $\Gamma_{s,i}=2\xi_{s,i}+\gamma_{s,i}$.

To justify the validity of the single-mode assumption, we compare the cluster spacing $\Delta\Omega_{Cl}$, i.e., the frequency separation between two pairs of signal and idler cavity modes satisfying energy conservation, to the gain linewidth of the backward-wave SPDC. The cluster spacing can be obtained by solving $M(\omega)\Delta\Omega^2_{Cl}+N(\omega)\Delta\Omega_0=\pm 1$ with $M(\Omega)=[L/(2\pi c)]\{2[n'_s(\omega)+n'_i(\omega_i)]+\omega_s n''_s(\omega)+\omega_i n''_i\}$ and $N(\omega)=[L/(\pi c)][n_s-n_i+\omega_s n'_s(\omega_s)-\omega_i n'_i(\omega_i)]$, where $n_s$ and $n_i$ are the refractive indices at the signal and idler frequencies, and $n'_{s,i}$ and $n''_{s,i}$ are the first and second frequency derivatives, respectively [B22].

As an example we consider a resonated 3-cm long periodically poled KTP crystal. We take the resonant cavity to be the same length as the nonlinear crystal and to have a finesse of 1000. Then $\Delta\Omega_{Cl}\approx 2\pi\times 1.75$ cm$^{-1}$ and $\Delta\omega_G\approx 2\pi\times 0.08$ cm$^{-1}$. Since $\Delta\Omega_{Cl}>\Delta\omega_G$, when the cavity is appropriately tuned, there will only be a single mode-pair within the backward-wave gain linewidth (FIG. 12).

We estimate the linewidth, Glauber correlation time, and spectral brightness of the biphotons based on the above parameters. To ensure high purity of biphoton generation, we assume a pump power of 770 µW which is far below the threshold power so that the generation rate is small as compared to the inverse of the coherence time. For the optimum case of exact phase matching ($\Delta k'=0$), the total paired count rate is $R_1\approx 1.31\times 10^5$ s$^{-1}$ and the biphoton linewidth $\Delta\omega\approx 2\pi\times 2.1$ MHz is smaller than that of typical atomic transitions. The spectral brightness is then $R_1/\Delta\omega\approx 6.25\times 10^4$ s$^{-1}$ MHz$^{-1}$ or $8.16\times 10^4$ s$^{-1}$ MHz$^{-1}$ per mW of pump power.

Figure 13A:
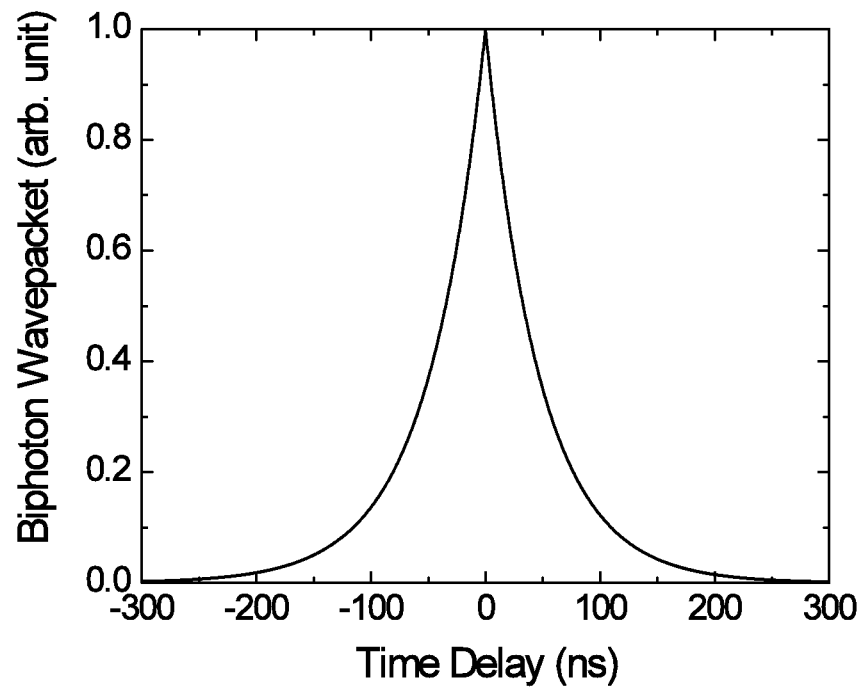
FIG. 13A is a calculated Glauber correlation function for the arrangement of FIG. 11B.
Figure 13B:
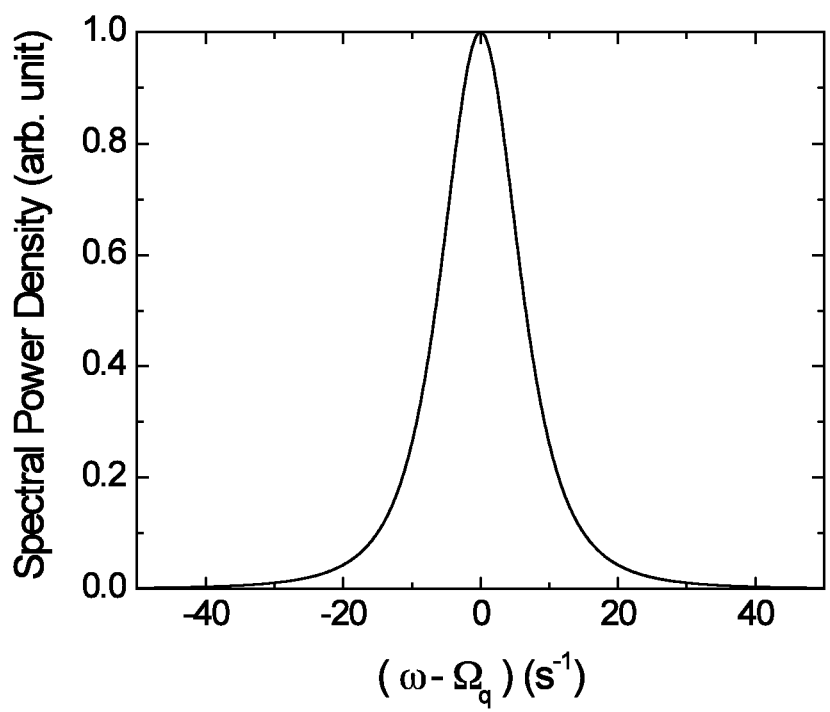
FIG. 13B is a calculated spectral power density for the arrangement of FIG. 11B.

Results of these calculations are shown on FIGS. 13A-B. Here FIG. 13A shows the time domain biphoton wavepacket of the backward-wave SPDC in a resonant cavity. Though difficult to see, this curve is slightly asymmetric (see Eq. (B12)). FIG. 13B shows the corresponding spectral power density at the signal frequency. The time domain biphoton wavepacket is given by Eq. (B12) and has a sharp fall-off (FIG. 13A) due to its Lorentzian-shaped spectrum [Eq. (B9) and (FIG. 13B)]. The Glauber correlation time $T_c\approx 68$ ns is approximately the sum of the ring-down times at the signal and idler frequencies.

To construct a source as described above we expect to use a KTP crystal which is periodically poled with a periodicity of $\Lambda=872$ nm. A 532 nm laser may be used as the pump source to generate signal and idler photons at the degenerate frequency of 1.064 µm. The pump and signal will be polarized along the crystal y axis, the idler is polarized along the crystal z axis, and quasiphase matching is accomplished in third order (m=3) so that $k_p=K_G+k_s-k_i$, where the lattice k-vector $K_G=2\pi m/\Lambda$. The ratio of spectral brightness of this resonant backward-wave source, as compared to a non-resonant forward wave source of the same material, pumping power, and length is about 80,000.

In conclusion we have described a narrowband biphoton source that utilizes resonant backward-wave parametric down-conversion. The narrow backward-wave gain linewidth allows a single mode output with both greatly increased spectral brightness, and also, the generation of biphotons that are sufficiently long that they may be amplitude or phase modulated by high speed light modulators [B23, B24]. If successfully constructed, applications may include quantum communication, quantum memories, and enhanced resistance against narrowband interference for quantum key distributed [B25].

REFERENCES

[A1] H. J. Kimble, Nature 453, 1023 (2008).
[A2] A. Kuhn, M. Hennrich, and G. Rempe, Phys. Rev. Lett. 89, 067901 (2002).
[A3] H. P. Keller, B. Lange, K. Hayasaka, W. Lange, and H. Walther, Nature 431, 1075 (2004).
[A4] J. McKeever, A. Boca, A. D. Boozer, R. Miller, J. R. Buck, A. Kuzmich, and H. J. Kimble, Science 303, 1992 (2004).

[A5] J. K. Thompson, J. Simon, H. Loh, and V. Vuletić, Science 313, 74 (2006).

[A6] V. Balić, D. A. Braje, P. Kolchin, G. Y. Yin, and S. E. Harris, Phys. Rev. Lett. 94, 183601 (2005).

[A7] S. Du, P. Kolchin, C. Belthangady, G. Y. Yin, and S. E. Harris, Phys. Rev. Lett. 100, 183603 (2008).

[A8] M. Scholz, L. Koch, R. Ullmann, and O. Benson, Appl. Phys. Lett. 94, 201105 (2009).

[A9] E. Pomarico, B. Sanguinetti, N. Gisin, R. Thew, H. Zbinden, G. Schreiber, A. Thomas, and W. Sohler, New J. Phys. 11, 113042 (2009).

[A10] F. Wolfgramm, Y. A. de Icaza Astiz, F. A. Beduini, A. Cerè, and M. W. Mitchell, Phys. Rev. Lett. 106, 053602 (2011).

[A11] H. Zhang, X.-M. Jin, J. Yang, H.-N. Dai, S.-J. Yang, T.-M. Zhao, J. Rui, Y. He, X. Jiang, F. Yang et al., Nature Photon. 5, 628 (2011).

[A12] N. Sangouard, C. Simon, H. de Riedmatten, and N. Gisin, Rev. Mod. Phys 83, 33 (2011).

[A13] Z. Y. Ou and Y. J. Lu, Phys. Rev. Lett. 83, 2556 (1999).

[A14] C. E. Kuklewicz, F. N. C. Wong, and J. H. Shapiro, Phys. Rev. Lett. 97, 223601 (2006).

[A15] M. Scholz, L. Koch, and O. Benson, Phys. Rev. Lett. 102, 063603 (2009).

[A16] C.-S. Chuu and S. E. Harris, Phys. Rev. A 83, 061803(R) (2011).

[A17] C. Canalias and V. Pasiskevicius, Nature Photon. 1, 459 (2007).

[A18] T. Ikegami, S. Slyusarev, T. Kurosu, Y. Fukuyama, and S. Ohshima, Appl. Phys. B 66, 719 (1998).

[A19] R. C. Eckardt, C. D. Nabors, W. J. Kozlovsky, and R. L. Byer, J. Opt. Soc. Am. B 8, 646 (1991).

[A20] K. Thyagarajan, J. Lugani, and S. Ghosh, K. Sinha, A. Martin, D. B. Ostrowsky, O. Alibart, and S. Tanzilli, Phys. Rev. A 80, 052321 (2009).

[A21] T. Chanelière, D. Matsukevich, S. D. Jenkins, S.-Y. Lan, T. A. B. Kennedy, and A. Kuzmich, Nature 438, 833 (2005).

[A22] C.-S. Chuu, T. Strassel, B. Zhao, M. Koch, Y.-A. Chen, S. Chen, Z.-S. Yuan, J. Schmiedmayer, and J.-W. Pan, Phys. Rev. Lett. 101, 120501 (2008).

[A23] B. Zhao, Y.-A. Chen, X.-H. Bao, T. Strassel, C.-S. Chuu, X.-M. Jin, J. Schmiedmayer, Z.-S. Yuan, S. Chen, and J.-W. Pan, Nature Phys. 5, 95 (2009).

[A24] R. Zhao, Y. O. Dudin, S. D. Jenkins, C. J. Campbell, D. N. Matsukevich, T. A. B. Kennedy, and A. Kuzmich, Nature Phys. 5, 100 (2009).

[A25] P. Kolchin, C. Belthangady, S. Du, G. Y. Yin, and S. E. Harris, Phys. Rev. Lett. 101, 103601 (2008).

[A26] C. Belthangady, S. Du, C.-S. Chuu, G. Y. Yin, and S. E. Harris, Phys. Rev. A 80, 031803(R) (2009).

[A27] H. P. Specht, J. Bochmann, M. Mücke, B. Weber, E. Figueroa, D. L. Moehring, and G. Rempe, Nature Photon. 3, 469 (2009).

[A28] C. Belthangady, C.-S. Chuu, I. A. Yu, G. Y. Yin, J. M. Kahn, and S. E. Harris, Phys. Rev. Lett. 104, 223601 (2010).

[B1] S. E. Harris, Appl. Phys. Lett. 9, 114 (1966).

[B2] D. S. Chemla, E. Batifol, R. L. Byer, and R. L. Herbst, Opt. Commun. 11, 57 (1974).

[B3] A. Yariv, *Quantum Electronics* (Wiley, New York, 1989).

[B4] Y. J. Ding and J. B. Khurgin, IEEE J. Quant. Electron. 32, 1574 (1996).

[B5] H. Su, S. Ruan, and Y. Guo, J. Opt. Soc. Am. B 23, 1626 (2006).

[B6] M. M. Fejer, G. A. Magel, D. H. Jundt, and R. L. Byer, IEEE J. Quant. Electron. 28, 2631 (1992).

[B7] C. Canalias, V. Pasiskevicius, V. Clemens, and F. Laurell, Appl. Phys. Lett. 82, 4233 (2003).

[B8] C. Canalias, V. Pasiskevicius, M. Fokine, and F. Laurell, Appl. Phys. Lett. 86, 181105 (2005).

[B9] C. Canalias and V. Pasiskevicius, Nature Photon. 1, 459 (2007).

[B10] E. Knill, R. Laflamme, and G. J. Milburn, Nature (London) 409, 46 (2001).

[B11] H. J. Briegel, W. Dur, J. I. Cirac, and P. Zoller, Phys. Rev. Lett. 81, 5932 (1998).

[B12] See, for example, C.-S. Chuu et al., Phys. Rev. Lett. 101, 120501 (2008); B. Zhao et al., Nature Phys. 5, 95 (2009); R. Zhao et al., Nature Phys. 5, 100 (2009).

[B13] D. E. Browne and T. Rudolph, Phys. Rev. Lett. 95, 010501 (2005).

[B14] T. P. Bodiya and L.-M. Duan, Phys. Rev. Lett. 97, (2006).

[B15] L.-M. Duan, M. D. Lukin, J. I. Cirac, and P. Zoller, Nature 414, 413 (2001).

[B16] M. Halder, A. Beveratos, N. Gisin, V. Scarani, C. Simon, and H. Zbinden, Nature Phys. 3, 692 (2007).

[B17] See, for example, Z. Y. Ou and Y. J. Lu, Phys. Rev. Lett. 83, 2556 (1999); C. E. Kuklewicz, F. N. C. Wong, and J. H. Shapiro, ibid. 97, 223601 (2006); M. Scholz, L. Koch, and O. Benson, ibid. 102, 063603 (2009).

[B18] M. Keller, B. Lange, K. Hayasaka, W. Lange, and H. Walther, Nature (London) 431, 1075 (2004).

[B19] V. Balić, D. A. Braje, P. Kolchin, G. Y. Yin, and S. E. Harris, Phys. Rev. Lett. 94, 183601 (2005).

[B20] S. E. Harris, Phys. Rev. Lett. 98, 063602 (2007).

[B21] E. Pomarico, B. Sanguinetti, N. Gisin, R. Thew, H. Zbinden, G. Schreiber, A. Thomas, and W. Sohler, New J. Phys. 11, 113042 (2009).

[B22] R. C. Eckardt, C. D. Nabors, W. J. Kozlovsky, and R. L. Byer, J. Opt. Soc. Am. B 8, 646 (1991).

[B23] H. P. Specht, J. Bochmann, M. Mücke, B. Weber, E. Figueroa, D. L. Moehring, and G. Rempe, Nature Photon. 3, 469 (2009).

[B24] C. Belthangady, S. Du, C.-S. Chuu, G. Y. Yin, and S. E. Harris, Phys. Rev. A 80, 031803(R) (2009).

[B25] C. Belthangady, C.-S. Chuu, I. A. Yu, G. Y. Yin, J. M. Kahn, and S. E. Harris, Phys. Rev. Lett. 104, 223601 (2010).

The invention claimed is:

1. A biphoton source comprising:
   a source of pump radiation; and
   a nonlinear optical medium configured to receive the pump radiation and to provide phase-matched spontaneous parametric down-conversion (SPDC) of the pump radiation to provide co-propagating signal radiation and idler radiation;
   wherein the nonlinear optical medium comprises two endfaces of the medium coated to reflect both the signal radiation and the idler radiation, and having endface curvatures such that a monolithic optical resonator is formed for both the signal radiation and the idler radiation in the nonlinear optical medium;
   wherein the source of pump radiation is configured to provide the pump radiation at an intensity that is less than a pump intensity threshold for optical parametric oscillation in the nonlinear optical medium.

2. The biphoton source of claim 1, further comprising a coating on one of the endfaces to reflect the pump radiation, whereby the pump radiation makes a double pass through the nonlinear optical medium.

3. The biphoton source of claim 1, wherein the signal radiation and the idler radiation have orthogonal polarizations.

4. The biphoton source of claim 1, wherein the signal radiation and the idler radiation have parallel polarizations.

5. The biphoton source of claim 1, wherein the signal radiation and the idler radiation have different frequencies.

6. The biphoton source of claim 1, wherein the signal radiation and the idler radiation have the same frequency.

7. The biphoton source of claim 1:
wherein the signal radiation includes first and second signal modes having the same frequency and orthogonal polarization;
wherein the idler radiation includes first and second idler modes having the same frequency and orthogonal polarization;
wherein the first signal mode and the first idler mode have parallel polarization;
wherein the nonlinear optical medium includes quasi phase-matching structures that simultaneously phase match SPDC to provide the first signal mode and the second idler mode and SPDC to provide the second signal mode and the first idler mode.

8. The biphoton source of claim 1, wherein the source of pump radiation provides the pump radiation in a single transverse mode and/or a single longitudinal mode.

9. A nonlinear optical medium configured for use in a source of polarization entangled biphotons, the medium comprising:
a nonlinear optical material configured to receive pump radiation and to provide phase-matched spontaneous parametric down-conversion (SPDC) of the pump radiation to provide signal radiation and idler radiation responsive to the pump radiation; and
two endfaces of the nonlinear optical material coated to reflect both the signal radiation and the idler radiation, and having endface curvatures such that a monolithic optical resonator is formed for both the signal radiation and the idler radiation in the nonlinear optical material;
wherein the signal radiation includes first and second signal modes having the same frequency and orthogonal polarization;
wherein the idler radiation includes first and second idler modes having the same frequency and orthogonal polarization;
wherein the first signal mode and the first idler mode have parallel polarization;
wherein the nonlinear optical medium includes quasi phase-matching structures that simultaneously phase match SPDC to provide the first signal mode and the second idler mode and SPDC to provide the second signal mode and the first idler mode.

10. The nonlinear optical medium of claim 9, further comprising a coating on one of the endfaces to reflect the pump radiation, whereby the pump radiation makes a double pass through the nonlinear optical medium.

11. A biphoton source comprising:
a source of pump radiation; and
a nonlinear optical medium configured to receive the pump radiation and to provide phase-matched spontaneous parametric down-conversion (SPDC) of the pump radiation to provide counter-propagating signal radiation and idler radiation; and
an optical resonator that is resonant for both the signal radiation and the idler radiation, and which includes the nonlinear optical medium;
wherein the source of pump radiation is configured to provide the pump radiation at an intensity that is less than a pump intensity threshold for optical parametric oscillation in the nonlinear optical medium.

12. The biphoton source of claim 11, wherein the optical resonator is formed by two endfaces of the nonlinear optical material coated to reflect both the signal radiation and the idler radiation.

13. The biphoton source of claim 11, wherein the pump radiation is configured to make a double pass through the nonlinear optical medium.

14. The biphoton source of claim 11, wherein phase-matching is provided by quasi phase-matching structures in the nonlinear optical medium.

15. The biphoton source of claim 14, wherein the quasi phase-matching structures have a period selected to provide quasi phase-matching of the SPDC having an odd order greater than one.

16. The biphoton source of claim 11, wherein the signal radiation and the idler radiation have orthogonal polarizations.

17. The biphoton source of claim 11, wherein the signal radiation and the idler radiation have parallel polarizations.

18. The biphoton source of claim 11, wherein the signal radiation and the idler radiation have different frequencies.

19. The biphoton source of claim 11, wherein the signal radiation and the idler radiation have the same frequency.

20. The biphoton source of claim 11:
wherein the signal radiation includes first and second signal modes having the same frequency and orthogonal polarization;
wherein the idler radiation includes first and second idler modes having the same frequency and orthogonal polarization;
wherein the first signal mode and the first idler mode have parallel polarization; and
wherein the nonlinear optical medium includes quasi phase-matching structures that simultaneously phase match SPDC to provide the first signal mode and the second idler mode and SPDC to provide the second signal mode and the first idler mode.

21. The biphoton source of claim 11, wherein the source of pump radiation provides the pump radiation in a single transverse mode and/or a single longitudinal mode.

* * * * *